(12) United States Patent
Robles et al.

(10) Patent No.: US 11,013,367 B2
(45) Date of Patent: May 25, 2021

(54) COOKING APPLIANCE COMPRISING A FIRST AND A SECOND COOKING PLATE, AND METHOD FOR CONTROLLING THE DISTANCE BETWEEN COOKING PLATES

(71) Applicant: Electrolux Professional S.p.A., Pordenone (IT)

(72) Inventors: Antonio Robles, Pordenone (IT); Deny Longo, Pordenone (IT)

(73) Assignee: Electrolux Professional S.p.A., Pordenone (IT)

( * ) Notice: Subject to any disclaimer, the term of this patent is extended or adjusted under 35 U.S.C. 154(b) by 204 days.

(21) Appl. No.: 16/066,400

(22) PCT Filed: Dec. 22, 2016

(86) PCT No.: PCT/EP2016/082486
§ 371 (c)(1),
(2) Date: Jun. 27, 2018

(87) PCT Pub. No.: WO2017/121610
PCT Pub. Date: Jul. 20, 2017

(65) Prior Publication Data
US 2019/0000266 A1    Jan. 3, 2019

(30) Foreign Application Priority Data

Jan. 14, 2016 (EP) .................................. 16151356

(51) Int. Cl.
*A47J 37/06* (2006.01)
(52) U.S. Cl.
CPC .... *A47J 37/0611* (2013.01); *A47J 2037/0617* (2013.01)
(58) Field of Classification Search
CPC ...................... A47J 2037/0617; A47J 37/0611
(Continued)

(56) References Cited

U.S. PATENT DOCUMENTS

| 4,987,827 A | 1/1991 | Marquez |
| 7,913,615 B2 * | 3/2011 | Calzada ............... A47J 37/0611 426/523 |

(Continued)

FOREIGN PATENT DOCUMENTS

| WO | 2007127072 A2 | 11/2007 |
| WO | 2014008420 A2 | 1/2014 |
| WO | WO2014144335 A1 | 9/2014 |

OTHER PUBLICATIONS

International Search Report and Written Opinion issued in corresponding PCT Application Serial No. PCT/EP2016/082486 dated Mar. 20, 2017, 8 pages.

*Primary Examiner* — Reginald Alexander
(74) *Attorney, Agent, or Firm* — Pearne & Gordon LLP

(57) ABSTRACT

The present invention is related to a cooking appliance (100) comprising a first cooking plate (1) and a second cooking plate (2), said second cooking plate (2) being positionable in an operating condition, in which it faces the first cooking plate (1), so as to be able to heat a product positioned on the first cooking plate (1), and in an open condition in which it is lifted with respect to the first cooking plate (1) in such a way to allow freely positioning a food product on the first cooking plate (1), the cooking appliance (100) comprising a positioning device (3) for adjusting the position of the second cooking plate (2) with respect to the first cooking plate (1) when the second cooking plate (2) is in the operating condition, the positioning device allowing movements of the second cooking plate (2) with respect to the first cooking plate (1) having at least two degrees of freedom; it further comprises a control unit (4) operatively associated to the positioning device (3) and configured to control movements of the second cooking plate (2) with respect to the first cooking plate (1) individually for at least two of the at least two degrees of freedom. The invention is also related to a (Continued)

method for controlling a distance (d) between cooking plates (1, 2) of a cooking appliance (100) comprising a first cooking plate (1) and a second cooking plate (2), the second cooking plate (2) being positionable in an operating condition, in which it faces the first cooking plate (1), so as to be able to heat a product positioned on the first cooking plate (1), and in an open condition in which it is lifted with respect to the first cooking plate (1) in such a way to allow freely positioning a food product on the first cooking plate (1), the method comprising: —adjusting the position of the second cooking plate (2) relative to the first cooking plate (1), when the second cooking plate (2) is in the operating condition, by a movement of the second cooking plate (2) having at least two degrees of freedom; —calculating the distance between said first cooking plate (1) and the second cooking plate (2).

17 Claims, 8 Drawing Sheets

(58) Field of Classification Search
USPC .......................................... 99/379, 377, 349
See application file for complete search history.

(56) References Cited

U.S. PATENT DOCUMENTS

| | | | |
|---|---|---|---|
| 8,833,243 B2* | 9/2014 | Sands | A47J 37/0611 100/258 A |
| 2005/0000957 A1 | 1/2005 | Jones et al. | |
| 2005/0193897 A1* | 9/2005 | Nevarez | A47J 37/0611 99/349 |
| 2015/0305554 A1* | 10/2015 | Dorsten | A47J 37/0611 426/233 |
| 2016/0022091 A1* | 1/2016 | Freymiller | A47J 37/0611 426/233 |

* cited by examiner

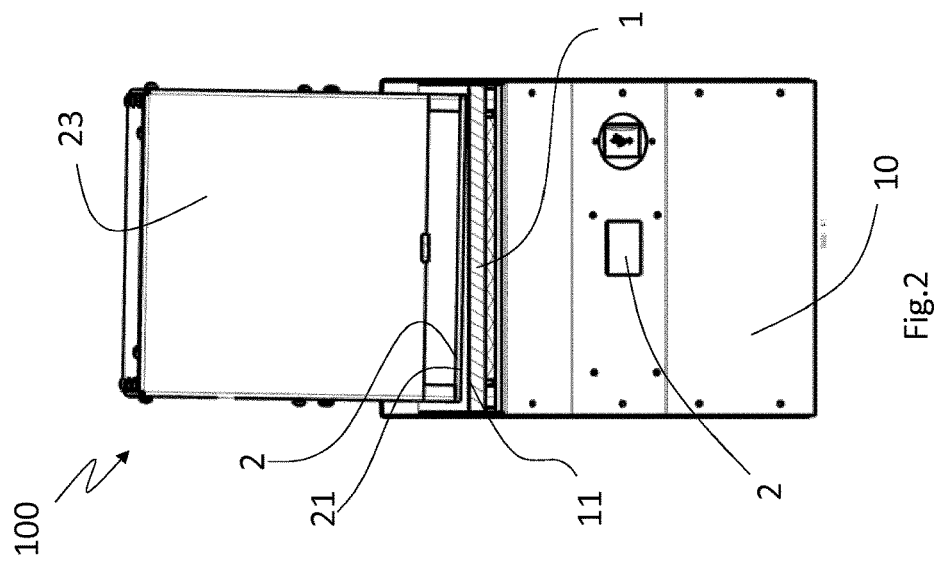
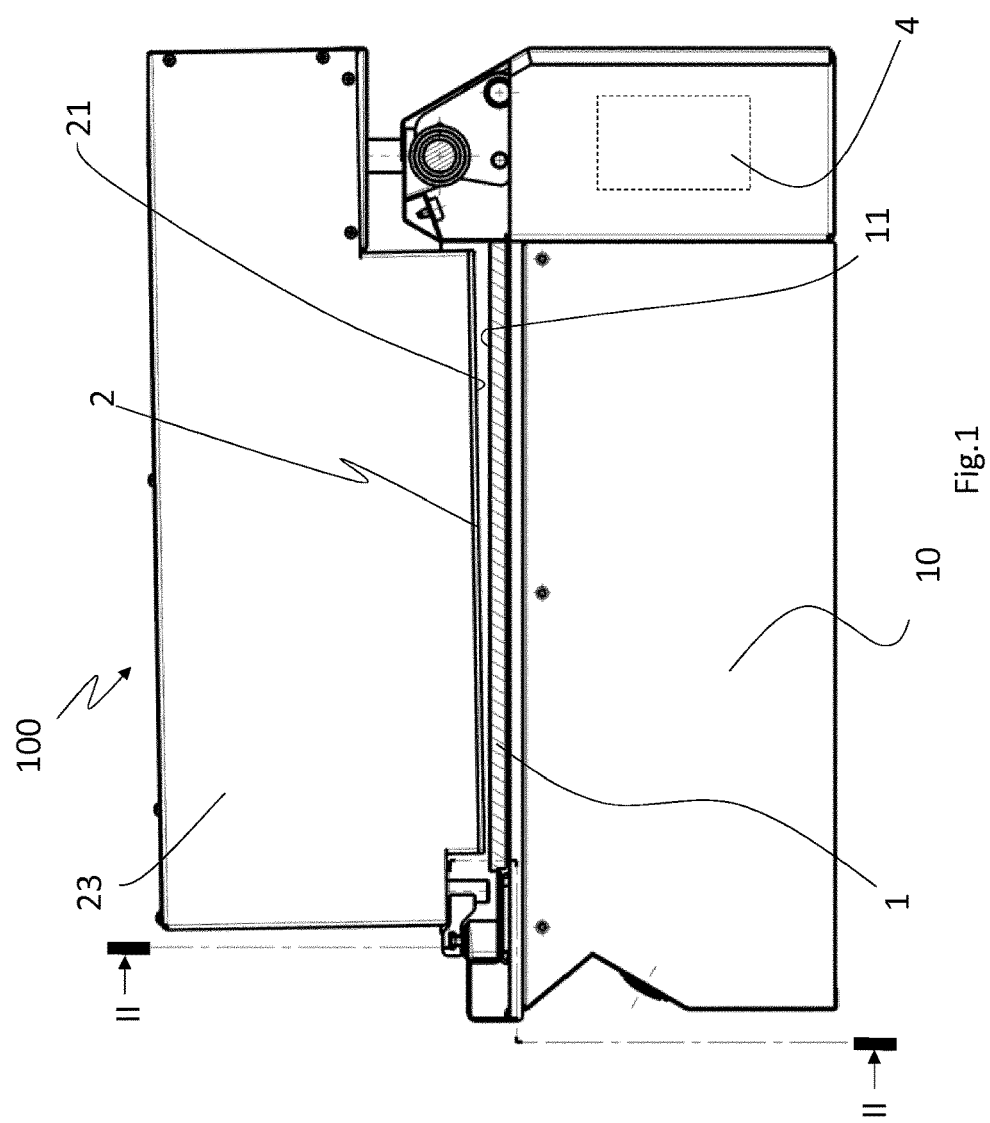

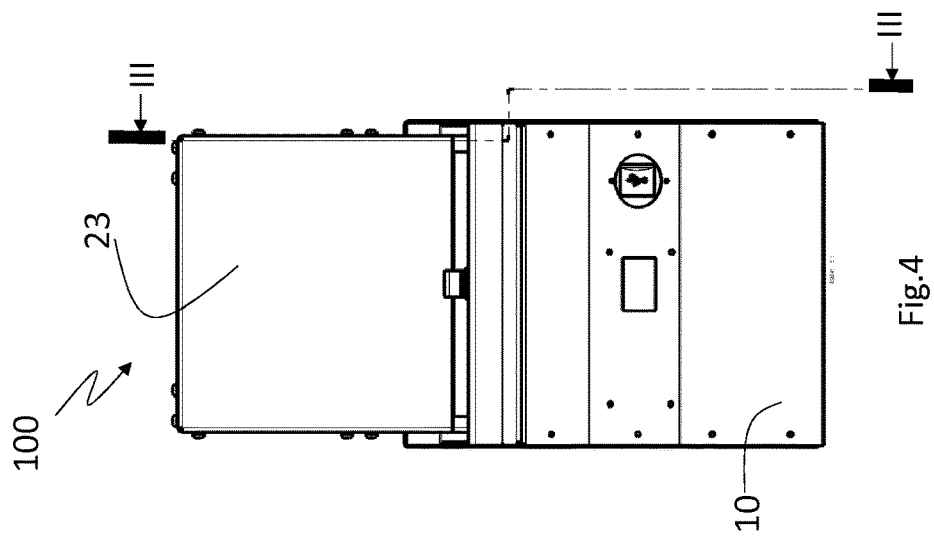
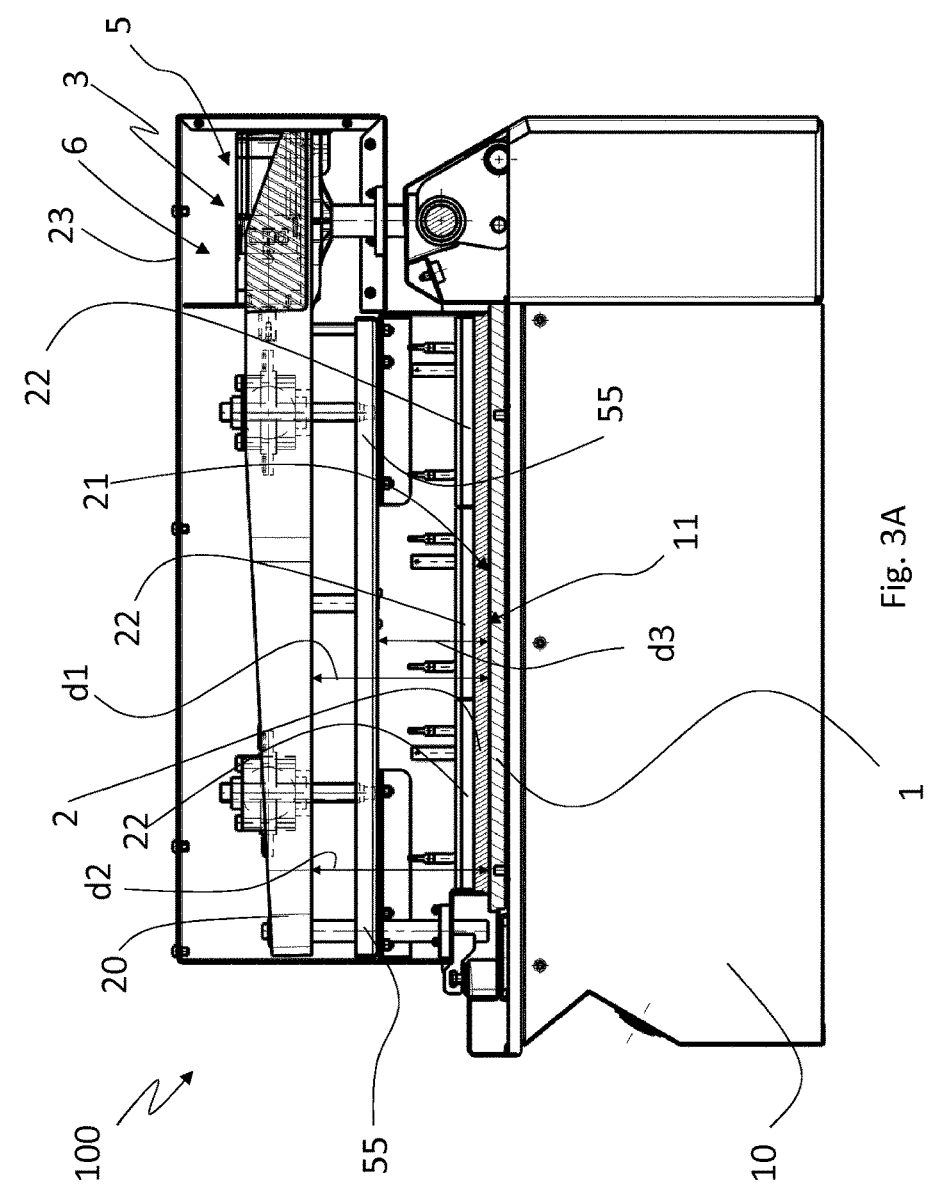
Fig. 4
Fig. 3A

COOKING APPLIANCE COMPRISING A FIRST AND A SECOND COOKING PLATE, AND METHOD FOR CONTROLLING THE DISTANCE BETWEEN COOKING PLATES

FIELD OF THE INVENTION

The present invention relates to a cooking appliance of the type including a first and second cooking plate, and a positioning device for adjusting the position of the first cooking plate relative to the second one.

BACKGROUND OF THE INVENTION

Cooking appliances comprising a lower and an upper cooking plates are well known in the art. They are known also as "clamshell grills".

During cooking phases, food is positioned between the cooking plates, typically in contact with respective cooking surfaces. In order to avoid excessive pressure on the food or, more in general, to obtain a correct cooking thereof, the distance between the cooking plates should be properly controlled according to the food thickness.

To this end, some appliances comprise a positioning mechanism, possibly operated by an electric motor, moving the upper cooking plate towards and away from the lower cooking plate in order to adjust the vertical position of the former.

For example, US 2005/0193897 discloses a cooking apparatus having first and second platens and a positioning mechanism for moving the second platen toward the first. A detector senses the second platen making contact with a food product disposed on the first platen and provides a signal which is used by a controller to select a cooking procedure for the food product according to the travel distance of the second platen.

The detector can include a micro switch, or a proximity or touch sensor attached to either the upper or lower platen.

Nevertheless, this sensors are easily subjected to malfunctioning caused by dirt or rest of food collected thereon.

As an alternative, US 2005/0193897 further discloses a detector monitoring the motor current of drive motors used for positioning the upper platen.

When upper platen contacts food product, the motor current changes. The detector detects this current change and signals the motor controller that upper platen made contact with the food product.

Also this solution is subjected to some drawbacks since, in order to obtain a detectable change in the current, it is required to provide a certain pressure on the food product. Nevertheless, it is often undesirable to subject food products to an excessive pressure.

Furthermore, it should be observed that a proper contact of the food product with the surface of the upper platen can be achieved only if the latter is parallel to the respective surface of the lower platen.

To this end it is often required to manually adjust alignment between such surfaces during set-up of the appliance making this operation easily subjected to errors and time consuming.

Furthermore, misalignments between the upper platen and the lower platen can also occur during normal operation of the appliance, resulting from wear of mechanical components, and/or from the allowance required in the moving parts, and/or from thermal deformation of the plates.

As a consequence, proper operation of the appliance cannot be guaranteed if maintenance is not performed periodically by a trained technician, such operation being expensive and time-consuming.

SUMMARY OF THE INVENTION

The aim of the invention is to provide a heating assembly that overcomes the drawbacks of known cooking appliance comprising an upper and a lower cooking plates.

Within this aim, a further object of the invention is to provide a cooking appliance in which the position of the upper cooking plate can be effectively controlled.

Still another object is to provide a cooking appliance in which the detection of the position of the upper cooking plate relative to the lower one is not subjected to malfunctioning due to the collection of dirt or rests of food products.

A further object is to provide a cooking appliance in which alignment between the upper and lower cooking plates can be achieved without requiring cumbersome or time-consuming operations.

Another object of the invention is to provide a cooking appliance in which misalignment between the upper and lower cooking plates occurred after setting-up the appliance can be easily corrected without requiring the intervention of a technician.

According to the invention it is provided a cooking appliance comprising a first cooking plate and a second cooking plate, the second cooking plate being positionable in an operating condition, in which it faces the first cooking plate, so as to be able to heat a product positioned on the first cooking plate, and in an open condition in which it is lifted with respect to the first cooking plate in such a way to allow freely positioning a food product on the first cooking plate, the cooking appliance comprising a positioning device for adjusting the position of the second cooking plate with respect to the first cooking plate when the second cooking plate is in the operating condition, the positioning device allowing movements of the second cooking plate with respect to the first cooking plate having at least two degrees of freedom, wherein it further comprises a control unit operatively associated to the positioning device and configured to control movements of the second cooking plate with respect to the first cooking plate individually for at least two of the at least two degrees of freedom.

It is to be understood that the in the cooking appliance according to the invention, positioning of the second cooking plate relative to the first one is improved such that it is possible to obtain a better parallelism or alignment of the cooking plates.

At the same time, the mutual movement of the cooking plates is controlled by the control unit so that alignment or any other controlled relative movement between the cooking plates can be easily performed as required.

As a consequence, misalignments can be easily corrected and the distance between the cooking plates can be precisely determined relative to a reference position, e.g. defined by a position in which contact occurs between the cooking plates.

This makes also possible to control the position of the second cooking plates relative to the first one by calculating the movements of the second cooking plates from the reference position.

Therefore, it is possible to control the distance between the cooking plates without necessarily positioning any sensor on or next to the cooking plates themselves.

Furthermore, since the movement of the cooking plates is controlled by the control unit, which can be easily programmed, any adjustment of the position of second cooking plate relative to the first one can be achieved automatically, without requiring manual intervention.

In this manner, re-alignment of the cooking plates can be performed periodically, also before starting any cooking process, without requiring specific maintenance of the appliance.

According to a preferred embodiment, the at least two degrees of freedom comprise at least a rotation and a linear translation of the second cooking plate toward to/away from the first cooking plate.

Preferably, the at least two degrees of freedom comprise two rotations (preferably relative respectively to two reciprocally perpendicular axes) and a linear translation of the second cooking plate toward to/away from the first cooking plate.

Therefore, the positioning device can be used not only for alignment of the cooking plates but also for variating the distance between the cooking plates according to the specific food product to be cooked.

Preferably, the cooking appliance comprises at least one electric drive unit for each one of the two or more degrees of freedom. In this manner, movements according to the degrees of freedom can be easily controlled by controlling the operation of each electric drive unit. According to a preferred embodiment, the positioning device is capable of adjusting the position of three non-aligned points of the second cooking plate with respect to the first cooking plate.

This allows controlling the position of the second cooking plate such that it is oriented according to a specific spatial orientation, thus further improving the precision of its positioning and the possibility of aligning it with the first cooking plate.

Furthermore, this also makes it possible to adjust the position of the three non-aligned points both for aligning the cooking plate and for varying the distance between them.

According to a preferred embodiment, the position of the three non-aligned points is adjustable along a direction perpendicular to the first cooking plate.

Accordingly, the second cooking plate can be oriented parallel to the first cooking plate since the former can be oriented in the space.

Preferably, the position of each of the non-aligned points is controlled by a respective electric drive unit, thus allowing control of the position of the second cooking plate at the three non-aligned points with a simple and economic solution.

According to a preferred embodiment, the electric drive units are operable in a simultaneous or alternated manner so as to vary a distance between the first cooking plate and the second cooking plate.

Preferably, the cooking appliance further comprises a detecting device operationally associated to the positioning device so as to detect if relative movement of the second cooking plate toward the first cooking plate is prevented along any one of the degrees of freedom.

It is to be noticed that relative movement of the second cooking plate toward the first cooking plate is prevented along one or more (but not all) of the degrees of freedom in case of partial contact between the cooking plates. Contrarily, movement will be prevented along all degrees of freedom in case of full contact between the cooking plates.

Therefore, in this manner, movement of the second cooking plate along a specific degree of freedom can be timely stopped while the movement along the other degrees of freedom may continue until a full contact is achieved. It is highlighted that a "full contact" between the cooking plates has to be understood as a contact that does not allow any further movement of the cooking plates in the sense of their reciprocal approach, while a "partial contact" allows further parts or portion or points of the cooking plates to be further reciprocally approached.

According to a preferred embodiment, each drive unit comprises a motor driving a threaded rod engaging in a threaded connection the second cooking plate at each of the non-aligned points.

Accordingly, linear translation of the cooking plate in correspondence of the three points can be easily and precisely achieved.

According to a preferred embodiment, the detecting device comprises a sensor element associated to each motor detecting changes in load on the motors.

This allows detecting a contact between the second cooking plate and the first one without requiring any sensors positioned on or next to the cooking plate.

According to a preferred embodiment, each drive unit comprises a respective speed reducer unit. In this manner, it is possible to control the movement of the cooking plate caused by the motors in more precise way, and to easily detect changes in the load of the motors, e.g. generated by the second cooking plate contacting the first.

According to a preferred embodiment, the motor of each drive unit comprises a respective drive shaft having a rotation axis parallel to the direction perpendicular to the cooking surface.

Preferably, the cooking appliance further comprises a base and an upper support member, the first cooking plate and the second cooking plate being respectively associated to the base and to the upper support member.

Even more preferably, the upper support member is hinged to the base, so that it can be rotated with respect to the latter, for taking the second cooking plate in the open condition and in the operating condition. This makes it possible to easily place the food product on the lower cooking plate of the appliance when the upper support member is in the open condition.

According to a further aspect, the invention also refers to a method for controlling a distance between cooking plates of a cooking appliance comprising a first cooking plate and a second cooking plate, the second cooking plate being positionable in an operating condition, in which it faces the first cooking plate, so as to be able to heat a product positioned on the first cooking plate, and in an open condition in which it is lifted with respect to the first cooking plate in such a way to allow freely positioning a food product on said first cooking plate, the method comprising:

adjusting the position of the second cooking plate relative to the first cooking plate, when said second cooking plate is in the operating condition, by a movement of the second cooking plate having at least two degrees of freedom;

calculating the distance between the first cooking plate and the second cooking plate.

Advantageously, the distance between the first cooking plate and the second cooking plate can be calculated with respect to a reference position in which the second cooking plate fully contacts the first cooking plate.

It is to be understood that "fully contacts" means that the second cooking plate contacts the first cooking plate in such a way that no further movements of the cooking plates in the sense of their reciprocal approach is allowed.

More advantageously, in the reference position the cooking plates are heated at an operative temperature, the cooking plates being heated before or after the second cooking plate fully contacts the first cooking plate.

Preferably the operative temperature is a temperature equal or similar to the temperature at which the cooking plates will be heated during cooking.

This allows taking into account possible deformations deriving from heating the cooking plates during operating the appliance, when controlling the distance between the cooking plates. Accordingly, the reference position can be obtained in a more reliable manner.

Also according to this aspect, the relative position between the cooking plates can be adjusted so as to bring them closer to a condition in which they are parallel one to the other.

Therefore, distance between cooking plates can be controlled more precisely since their alignment is improved and their distance can be measured accurately.

Preferably, adjusting the position of the second cooking plate relative to the first cooking plate, when the second cooking plate is in the operating condition, comprises at least rotating the second cooking plate with respect to the first cooking plate and linearly moving the second cooking plate toward to/away from the first cooking plate.

Accordingly, linear movement can be used both for alignment of the cooking plates if associated with the rotation thereof, and for variating the distance between the cooking plate according to food product to be cooked.

According to a preferred embodiment, adjusting the position of the second cooking plate relative to the first cooking plate, when the second cooking plate is in the operating condition, comprises adjusting individually the position of three non-aligned points of the second cooking plate with respect to the second cooking plate. In fact, being the second cooking plate a rigid body, by moving individually three non-aligned points of such a second cooking plate, the spatial orientation of the latter is changed, and therefore, by opportunely controlling the position (e.g. the distance of each single point from the first cooking plate) of the three points, it is possible obtaining a translation and/or a rotation of the second cooking plate, so as to change its distance and/or position with respect to the first cooking plate.

In this manner, the second cooking plate can be oriented according to a spatial orientation, thus further improving the precision of its positioning and the possibility of aligning it with the with the first cooking plate.

According to another preferred embodiment, the cooking appliance comprises at least one drive unit for each of the two or more degrees of freedom, and moving the second cooking plate with respect to the first cooking plate comprises operating the drive units simultaneously or alternately. Preferably, the position of each of the three non-aligned points is adjusted by a respective electric drive unit.

This allows to easily control the position of each point in an independent manner from the position of the other.

Furthermore, this allows control of the position of the second cooking plate at the three non-aligned points with a simple solution.

According to a preferred embodiment, adjusting the position of the second cooking plate relative to the first cooking plate, when the second cooking plate is in the operating condition, further comprises:

moving the second cooking plate toward the first cooking plate according to a first degree of freedom until a movement according to the first degree of freedom is prevented as a result of contact between the second cooking plate and the first cooking plate;

moving the second cooking plate toward the first cooking plate according to a second degree of freedom until a movement according to the second degree of freedom is prevented as a result of contact between the second cooking plate and the first cooking plate.

In this manner, alignment between the cooking plates can be achieved by moving the second cooking plate toward the first cooking plate until movement along the two degrees of freedom is prevented and thus a contact therebetween is achieved.

Preferably, the position of the second cooking plate relative to the first cooking plate is adjustable independently according to more than two degrees of freedom and the second cooking plate is moved toward the first cooking plate according to all degrees of freedom until a movement according to the all degrees of freedom is prevented.

In this manner it is possible to align even more precisely the cooking plates since the position of the second cooking plate relative to the first cooking plate is adjustable independently along more than two degrees of freedom.

Preferably, contact between the second cooking plate and the first cooking plate is detected by measuring the electrical current and/or voltage and/or power absorbed by any of the drive units.

This allows detecting contact between the second cooking plate and the first one without requiring any sensors positioned on or next to the cooking plate.

According to a preferred embodiment, distance between the first cooking plate and the second cooking plate is calculated with respect to a reference position of the second cooking plate.

Accordingly, it is possible to also determine the distance between the cooking plates without requiring any sensor positioned on or next to the cooking plate.

Preferably, the reference position is determined by a condition of contact in which contact between the second cooking plate and the first cooking plate occurs, thus allowing to obtain a reference position in a simple and reliable manner.

Even more preferably, the condition of contact comprises contact between the second cooking plate and the first cooking plate in correspondence of each of the three non-aligned points of the second cooking plate.

In this manner, precision of the calculated distance between the cooking plates relative to the reference position is further improved.

According to a preferred embodiment, the condition of contact is obtained by said moving the second cooking plate toward the first cooking plate according to all degrees of freedom until movement according to any of the degrees of freedom is prevented.

In this manner it is possible to obtain the cooking position by means of an automatic procedure, that can be easily operated and repeated when required.

Preferably, moving the second cooking plate toward the first cooking plate comprises further operating at least one of the drive units after the movement according to any of the degrees of freedom is prevented.

In this manner it is possible to push the second cooking plate toward the first cooking plate even after movement according to one degree of freedom is prevented. Accordingly, the contact thus obtained can be maintained even in case of adjustment of the position of the second cooking plate as a side effect of the movements according to the degrees of freedom for which movement is not yet prevented.

According to a further aspect, the invention also refers to a method for setting-up a reference position according to which a distance between a first cooking plate and a second cooking plate of a cooking appliance is calculated comprising:

moving the second cooking plate toward to the first cooking plate until a condition of contact in which contact between the second cooking plate and the first cooking plate occurs is reached;

heating the first cooking plate and the second cooking plate before or after having reached said condition of contact;

defining a reference position of the second cooking plate by the condition of contact between the second cooking plate and the first cooking plate, after said first and second cooking plates have been heated.

This further aspect of the invention can be implemented independently on the way in which the first and second cooking plates can reciprocally move.

According to this aspect the reference position can be defined in simple and reliable manner, without requiring any intervention from a technician.

Therefore, it is possible to set-up the cooking appliance and successively define the reference position.

Precision of the distance between plates is also improved since a "zero point", i.e. a reference point from which the positioning mechanism detects the distance travelled by the upper cooking plate, is correctly defined.

Preferably, the position of the second cooking plate relative to the first cooking plate can be adjusted by a movement of the second cooking plate having at least two degrees of freedom, the condition of contact between the second cooking plate and the first cooking plate being reached by:

moving the second cooking plate toward the first cooking plate according to a first degree of freedom until a movement according to the first degree of freedom is prevented;

moving the second cooking plate toward the first cooking plate according to a second degree of freedom until a movement according to the second degree of freedom is prevented.

In this manner in the contact condition misalignments between the cooking plates can be correct and, in other words, the contact can be effectively achieved. Therefore, precision is further improved the opposite surfaces of the cooking plates are parallel the one to the other and since the distance therebetween can be determined in a correct manner.

Preferably, the cooking appliance comprises at least one drive unit for each of the two or more degrees of freedom, and moving the second cooking plate with respect to the first cooking plate comprises operating the drive units.

According to a preferred embodiment, contact between the second cooking plate and the first cooking plate is detected by measuring the electrical current and/or voltage and/or power absorbed by any of the drive units.

This allows to detect contact between the second cooking plate and the first one without requiring any sensors positioned on or next to the cooking plate.

BRIEF DESCRIPTION OF THE DRAWINGS

These and other features and advantages of the invention will be better apparent from the following description of some exemplary and non-limitative embodiments, to be read with reference to the attached drawings, wherein:

FIG. 1 is a side view top of a cooking appliance according to the present invention with cooking plates in a misaligned condition;

FIG. 2 is a front view partially in section along line II-II of the cooking appliance of FIG. 1;

FIGS. 3A, 3B and 3C are side views partially in section along line III-III of the cooking appliance of the present invention with cooking plates in an aligned condition and placed in contact each other, positioned at a first distance and at a second distance, respectively;

FIG. 4 is a front view of the cooking appliance of FIG. 1 with cooking plate in an aligned condition;

DETAILED DESCRIPTION OF THE INVENTION

Figure 3B:
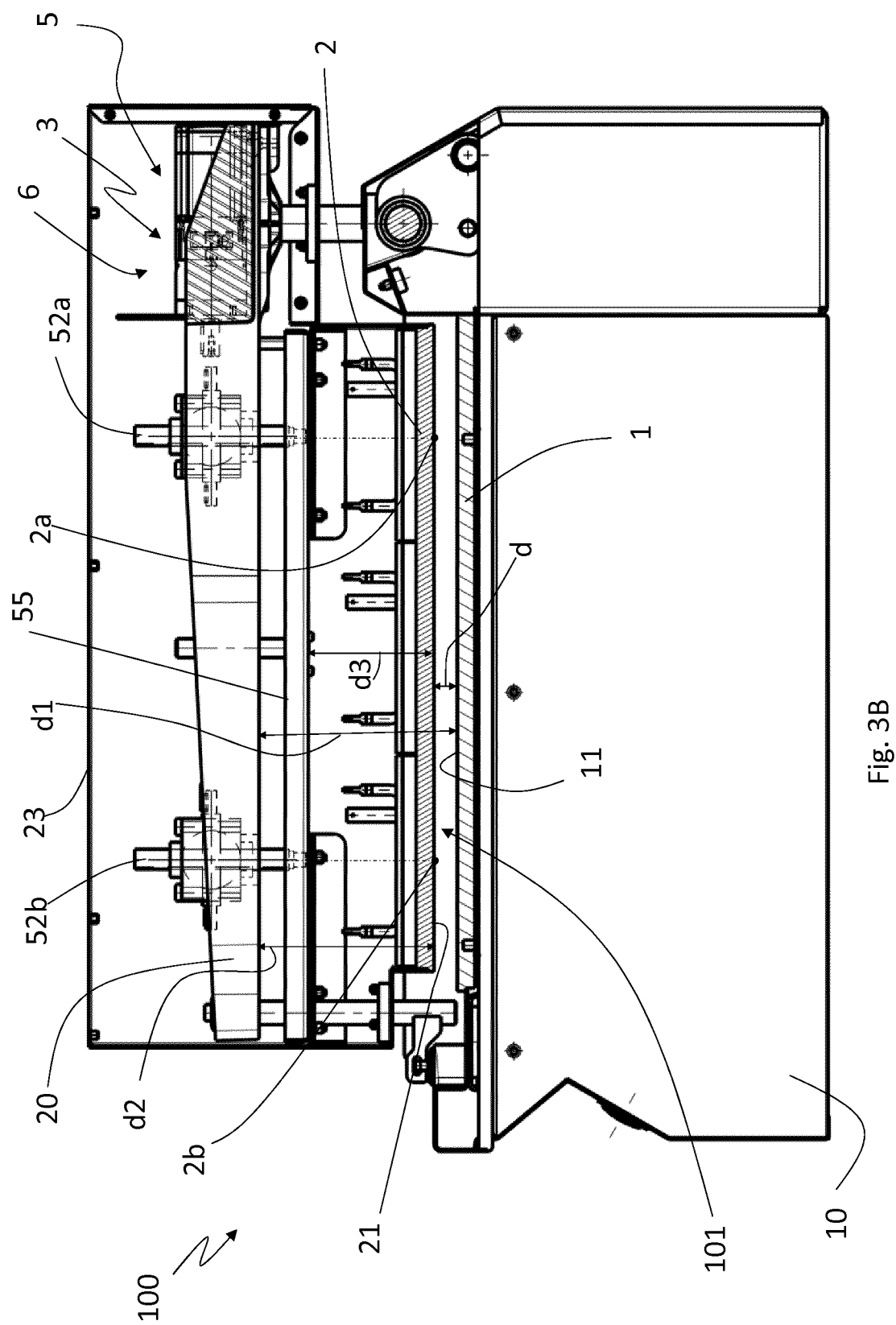

With reference initially to FIG. 1, a cooking assembly according to the invention is generally indicated with the reference number 100.

According to a preferred embodiment, the cooking appliance 100 comprises a first cooking plate 1 and a second cooking plate 2. Preferably, the first and second cooking plates 1, 2 comprises respective first and second cooking surfaces 11, 21, each heated by a heating element. In a preferred embodiment, the first and second cooking surfaces 11, 21 are heated by a plurality of heating elements, only the heating elements 22 of the second cooking plate 2 being represented in the drawings, e.g. in FIGS. 3A, 3B and 3C.

Preferably, the cooking assembly comprises a base 10 and an upper support member 20, supporting the first cooking plate 1 and the second cooking plate 2 respectively.

As it will be apparent in the following, according to an alternative embodiment, the second cooking plate 2 can be supported by the base 10 and the first cooking plate 1 by the upper support member 20.

Preferably, the upper support member 20 is hinged to the base 10.

Accordingly, the upper support member 20 together with the second cooking plate 2 can rotate with respect to the base 10 and to the first cooking plate 1, thus allowing access to a cooking region 101, shown in FIG. 3B, of the cooking assembly 100.

It should be noticed that, more in general, access to the cooking region 101 can be also achieved by spacing apart the second cooking plate 2 from the first cooking plate 1.

Figure 8:
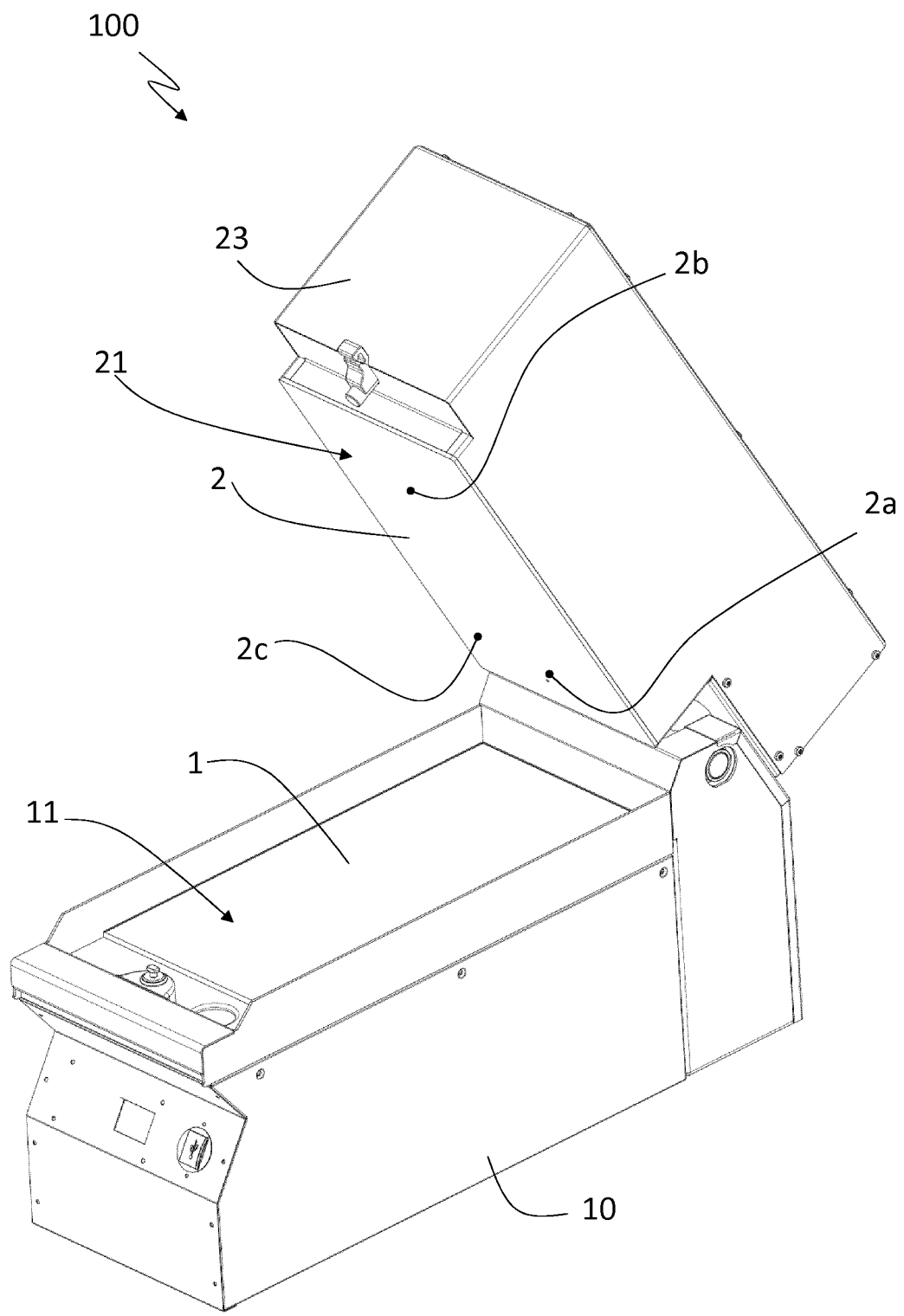
FIG. 8 is a perspective view of the cooking appliance of the present invention with the second cooking plate positioned in the open condition.

According to a preferred embodiment, this is achieved by configuring the second cooking plate 2 such that it is positionable in two different conditions. Preferably, such conditions comprises an operating condition, shown for example in FIG. 3B, in which the second cooking plate 2 faces the first cooking plate 1, so as to be able to heat a product positioned on the first cooking plate 1, and an open condition, shown for example in FIG. 8, in which it is lifted with respect to the first cooking plate 1 in such a way to allow freely positioning a food product, not illustrated, on the first cooking plate 1.

In other words, the cooking plates 1, 2 are preferably disposable in a spaced apart relationship to one another.

Therefore, also different connection between the cooking plates can be envisaged in order to do so.

Preferably, access to the cooking region 101 is achieved by moving manually the upper support member 20 and/or the second cooking plate 2, as this operation does not affect the relative position of cooking plates 1, 2 in their cooking position, i.e. in the position in which respective cooking surfaces 11, 21 are in contact or facing each other at a predetermined distance d, as shown e.g. in FIG. 3B.

Nevertheless, proper positioning of the cooking surfaces 11, 21 can be affected by misalignment of the cooking plate 1, 2, as shown in FIGS. 1 and 2.

Advantageously, when the second cooking plate 2 is in the operating condition, the distance d1 of the upper support member 20 from the first cooking surface 11 is fixed (i.e. it can't be modified); on the contrary, when the second cooking plate 2 is in the operating condition, the distance d2 of the second cooking surface 21 from the upper support member 20 can be modified, so as to modify the position of the second cooking plate 2 with respect to the first cooking plate 1. In other words, when the second cooking plate 2 is in the operating condition, the upper support member 20 is fixed with respect to the first cooking plate, and the second cooking plate 2 can move with respect to the upper support member 20, and therefore with respect to the first cooking plate 1. In order to adjust the relative position of the of the cooking plates 1, 2 the cooking appliance 100 comprises a positioning device 3 for adjusting the position of the second cooking plate 2 with respect to the first cooking plate 1, that can operate when the second cooking plate 2 is in the operating condition.

Preferably, the positioning device 3 is capable of adjusting the position of the second cooking plate 2 with respect to the first cooking plate 1 for two, more preferably three, degrees of freedom in an independent manner.

It will be appreciated that movements having two, preferably three, degrees of freedom will be suitable for disposing the second cooking plate 2 parallel to the first cooking plate 1 in case of misalignment similar to the one depicted in FIGS. 1 and 2. Accordingly, also the respective cooking surfaces 11, 21 will be positioned parallel to one another.

According to a preferred embodiment, the second cooking plate 2 can move relative to the first cooking plate 1 such that its cooking surface 21 can be oriented in space according to any predetermined orientation. This would allow correction of any misalignment between cooking plates 1, 2.

Figure 6:
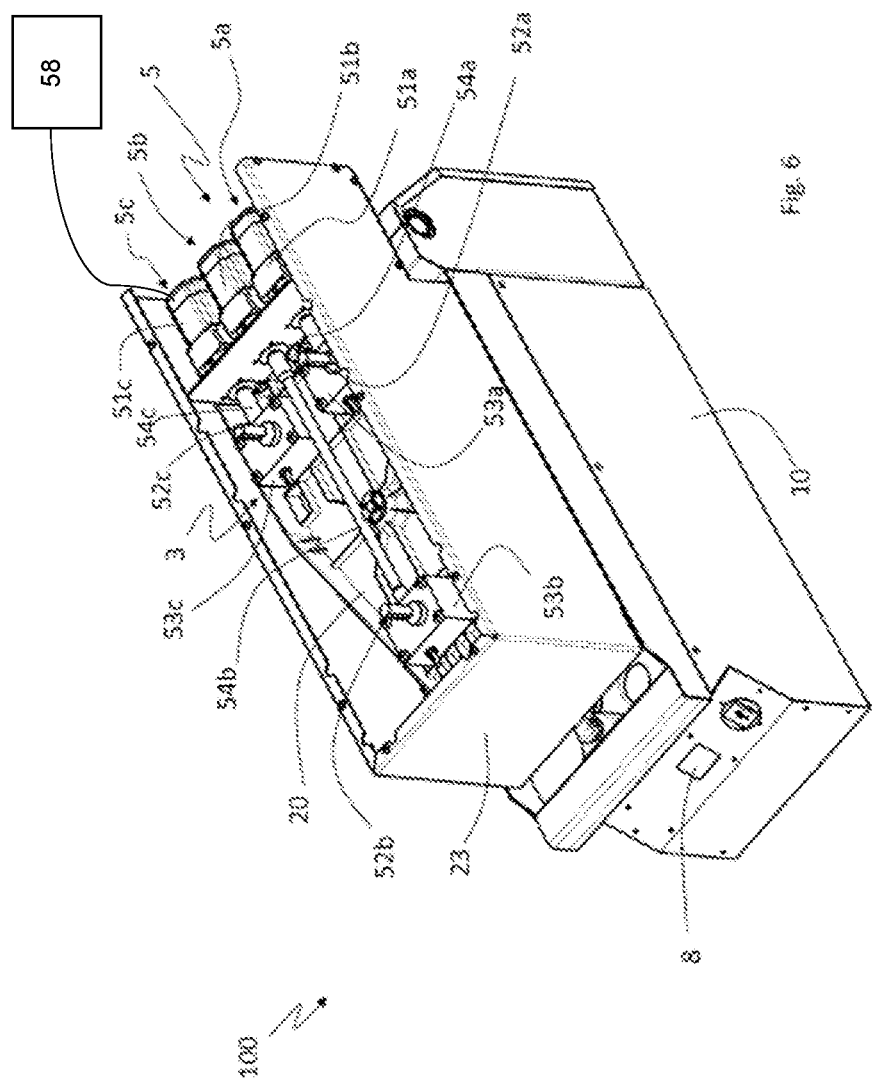
FIG. 6 is a perspective view of the cooking appliance of the present invention with a casing of a second cooking plate partially removed.
Figure 7:
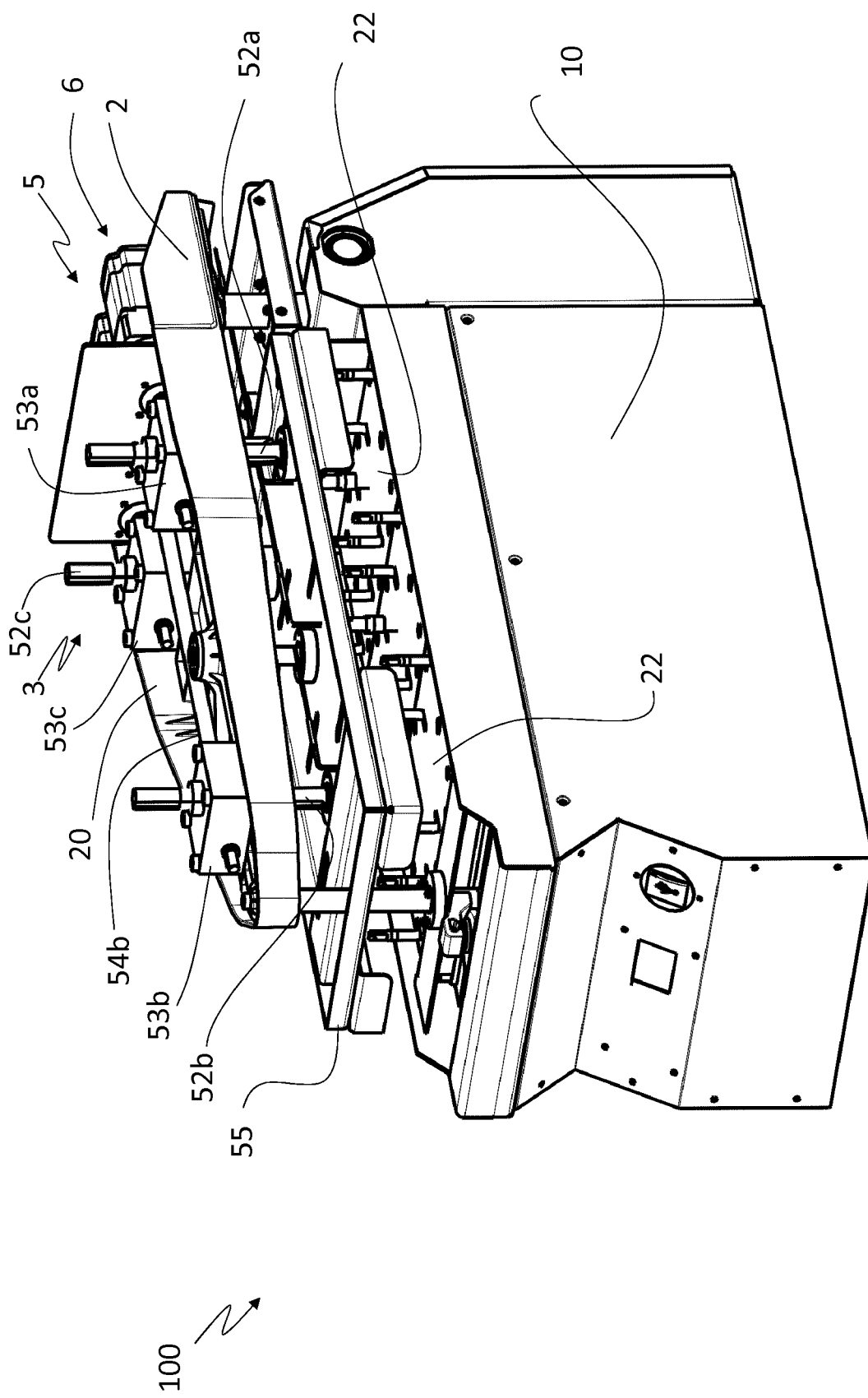
FIG. 7 is a perspective view of the cooking appliance of the present invention with the casing of the second cooking plate partially removed.

As better shown in FIGS. 6 and 7, according to a preferred embodiment, this is achieved by adjusting the position of three non-aligned points 2a, 2b, 2c of the second cooking plate 2 with respect to the first cooking plate 1. Preferably, the position of the three non-aligned points 2a, 2b, 2c is adjustable along a direction perpendicular to the second cooking plate 2 or to a cooking surface 21 thereof.

According to a preferred embodiment, the positioning device 3 is operated by a drive assembly 5 through a control unit 4, only schematically illustrated in FIG. 1. More in general, the control unit 4 is operatively associated to the positioning device 3 and configured to control movements of the second cooking plate 2 with respect to the first cooking plate 1 individually for each degree of freedom.

Preferably, to this end the control unit 4 is operatively associated to the drive assembly 5 as will be better explained in the following.

According to a preferred embodiment, the drive assembly 5 comprises three electric drive units 5a, 5b, 5c, each associated to a respective point of the three non-aligned points 2a, 2b, 2c.

Preferably, each electric drive units 5a, 5b, 5c can be operated by the control unit 4 both in simultaneous or alternated manner.

Accordingly, position of the three non-aligned points 2a, 2b, 2c can be adjusted individually or they can be displaced simultaneously. In the first case, displacement of a single point 2a, 2b, 2c will produce a rotation of the second cooking plate 2 with respect to the upper support member 20 or, more in general, to the first cooking plate 1. In the second case, simultaneous displacement thereof produces a linear translation of the second cooking plate 2 with respect to the first cooking plate 1.

Figure 3C:
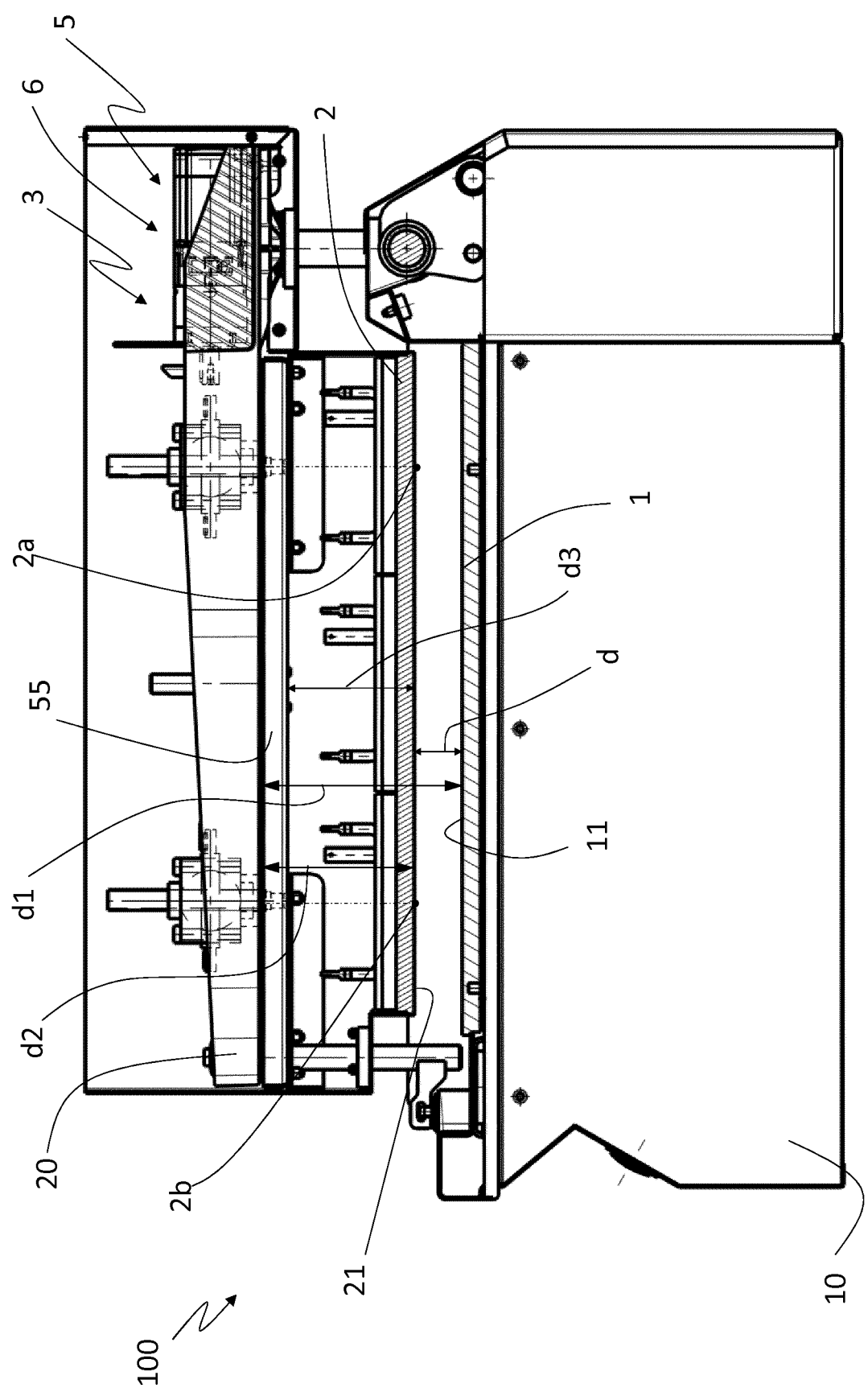
Figure 5:
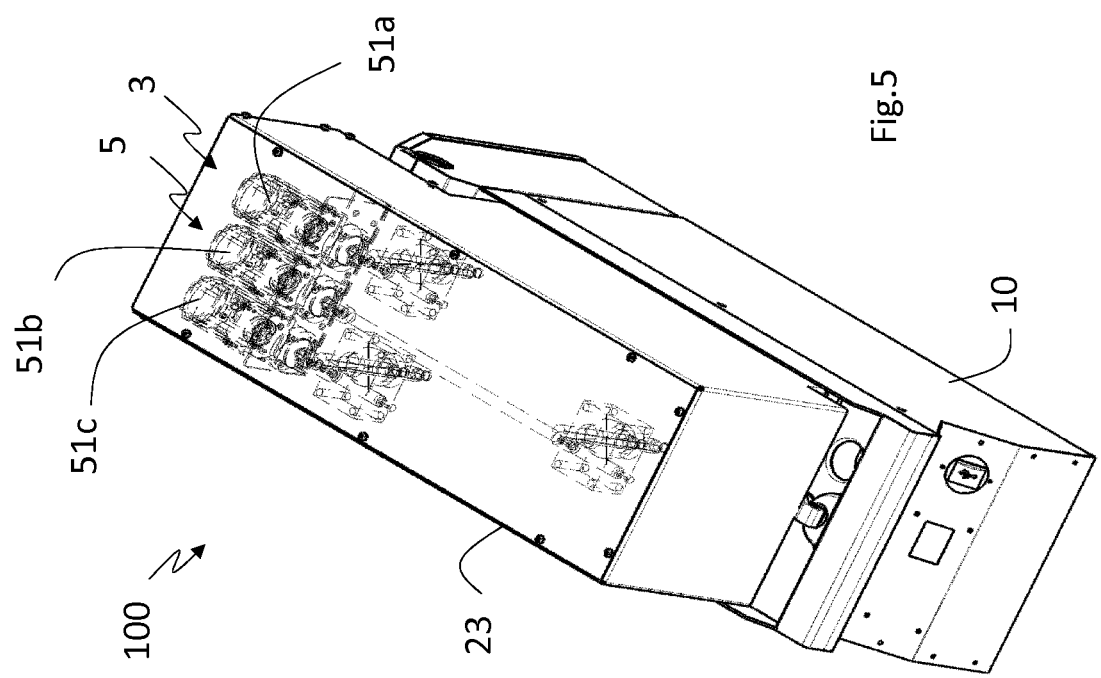
FIG. 5 is a perspective view of the cooking appliance of the present invention showing drive units of the second cooking plate in hidden lines.

As, according to a preferred embodiment, the position of the three non-aligned points 2a, 2b, 2c is adjustable along a direction perpendicular to the cooking surface 21, simultaneous displacement of thereof will also modify the distance d between the cooking plates 1, 2, as shown in FIGS. 3B and 3C.

It will be anyhow appreciated that also different solution can be envisaged for making the positioning device 3 capable of achieving both proper alignment of the cooking plates 1, 2 and variation of the distance d.

According to a preferred embodiment, this is obtained by a positioning device 3 capable of adjusting the position of the second cooking plate 2 with respect to the first cooking plate 1 at least along a rotation (preferably two rotations) and a linear translation of the second cooking plate toward to/away from the first cooking plate 1.

With reference again to FIG. 6, according to a preferred embodiment, each electric drive unit 5a, 5b, 5c comprises an electric motor 51a, 51b, 51c driving a threaded rod 52a, 52b, 52c engaging in a threaded connection the upper support member 20 and rotatably connected to the second cooking plate 2 at or in correspondence to each of the non-aligned points 2a, 2b, 2c.

In the advantageous embodiment illustrated in attached Figures, the free end of each threaded rod 52a, 52b, 52c is connected to an intermediate movable element 55, which is fixed to the second cooking plate 2 at a fixed distance d3, and is parallel to the second cooking plate 2, so that intermediate movable element 55 and second cooking plate 2 move integrally one another (anyway, in another advantageous embodiment, not illustrated, the second cooking plate 2 can be fixed directly to the free ends of the threaded rods, without the intermediate movable element 55). Accordingly, rotation of each threaded rod 52a, 52b, 52c moves (by moving intermediate movable element 55) the corresponding point 2a, 2b, 2c of the second cooking plate 2 toward to/away from the upper support member 20. A suitable play in the connection of the threaded rods 52a, 52b, 52c with the upper support member 20 and/or the intermediate movable element 55 (or second cooking plate 2) will allow the second cooking plate 2 also to perform at least limited rotations relative to the upper support member 20.

Preferably, drive units 5a, 5b, 5c are also supported on the upper support member 20. According to a preferred embodiment, the electric motor 51a, 51b, 51c of each drive unit 5a, 5b, 5c comprises a respective drive shaft 54a, 54b, 54c having a rotation axis parallel to the direction perpendicular to the second cooking surface 21.

In a preferred embodiment, each drive unit 5a, 5b, 5c comprises a respective speed reducer unit 53a, 53b, 53c, preferably disposed between each drive shaft 54a, 54b, 54c and respective threaded rod 52a, 52b, 52c.

Preferably, in order to protect the drive assembly 5, as well as the positioning device 3, the cooking appliance 100 comprises a casing 23 surrounding them.

Preferably the casing 23 is integral with the second cooking plate 23, so as to guarantee a perfect waterproofing of the assembly casing-second cooking plate.

According to a preferred embodiment, the cooking appliance 100 further comprises a detecting device 6, also shown in FIG. 3B, operationally associated to the positioning device 3 so as to detect if relative movement between the second cooking plate 2 and the first cooking plate 1 is prevented along each of the degrees of freedom.

Preferably, the detecting device 6 comprises a sensor element, e.g. a current sensor, or a voltage sensor, not illustrated, associated to each motor 51a, 51b, 51c for detecting changes in load on the motors 51a, 51b, 51c. Preferably, this is obtained by measuring the electrical current and/or voltage and/or power absorbed by the drive units 5a, 5b, 5c.

It should be noted that, in case of contact between the first and second cooking plates, movement according to at least one of the degrees of freedom will be prevented.

Accordingly, as contact occurs, a change will occur in the electrical current and/or voltage and/or power absorbed by the drive units 5a, 5b, 5c.

The operation of the heating assembly and its control method will be now described in detail. When the cooking appliance 100 is in operating condition, i.e. in the position in which the second cooking plate 2 is lowered on the first cooking plate 1, thus avoiding access to the cooking region 101, the operator can become aware of a misalignment between the cooking plates 1, 2, as shown in FIGS. 1 and 2. For example, such misalignment can be produced either by errors in the appliance set-up or by adaptation of the moving parts of thereof during normal operation.

According to one aspect of the present invention, the operator can operate the control unit 4 to adjust the position of the second cooking plate relative to the first cooking plate 1 in order to obtain a proper alignment of the cooking plates 1, 2 and therefore control the distance d between cooking plates 1, 2 in a precise manner.

A suitable input unit 8, schematically shown in attached figures, can be provided for operating the control unit 4 accordingly.

According to a preferred embodiment, the position of the second cooking plate 2 relative to the first cooking plate 1 is adjusted by initially moving the second cooking plate toward the first cooking plate 1 along at least one of the degrees of freedom.

In a preferred embodiment, this is achieved by means of the drive units 5a, 5b, 5c adjusting the position of the three non-aligned points 2a, 2b, 2c as previously explained. Preferably, the position of each of the three non-aligned points is adjusted by a respective electric drive unit.

In one embodiment, the drive units 5a, 5b, 5c are operated either simultaneously or alternately so that the second cooking plate 2 is displaced toward to the first cooking plate 1.

Since, as previously explained, the cooking plates are not perfectly aligned, contact between the cooking plates will occur only partially or locally.

Therefore, as a local contact occurs, movement along some degrees of freedom will be prevented while along other degrees of freedom will be still permitted.

Accordingly, alignment of the cooking plates can be obtained by moving the second cooking plate 2 toward the first cooking plate 1 according to each degree of freedom until a further movement according to all degrees of freedom is prevented. As apparent, in a preferred embodiment, the movement is prevented as a result of contact between the second cooking plate and the first cooking plate.

In practice, the second cooking plate 2 is moved toward the first cooking plate 1 according to a first degree of freedom until a further movement according to said first degree of freedom is prevented.

At the same time, or sequentially, the second cooking plate 2 is moved toward the first cooking plate 1 according to a further degree of freedom until a further movement is also prevented along said further degree of freedom.

By repeating applying this movement to all degrees of freedom available, it will be possible to bring the second cooking plate 2 into contact with the first cooking plate 1 as much as possible.

As previously explained, the use of three points 2a, 2b, 2c allows to obtain a proper contact and accordingly parallelism between the cooking plates 1, 2 provided that their cooking surfaces 11, 21 are flat.

It should be also again noted that, according to a preferred embodiment, contact between the second cooking plate 2 and the first cooking plate 1 can be detected by measuring the electrical current and/or voltage and/or power absorbed by the drive units 5a, 5b, 5c. Since the position of the second cooking plate 2 relative to the first cooking plate 1, when the second cooking plate 2 is in the operating condition, is now properly adjusted, it will be possible to calculate the distance d between the first cooking plate 1 and the second cooking plate 2 in a precise manner.

According to a preferred embodiment, the distance d can be determined without requiring any sensor positioned on or next to the cooking plate by calculating it with respect to a reference position of the second cooking plate.

It should be noted that the same steps also applies in case different embodiments are used for the drive units or in case adjustment is performed independently along two degrees of freedom.

As a matter of fact, the operating method previously described can also apply in any cases in which the position of the second cooking plate relative to the first cooking plate 1 is adjusted by at least rotating the second cooking plate with respect to the first cooking plate 1 and linearly moving the second cooking plate 2 toward to/away from the first cooking plate 1.

Once the reference position is defined, it will be possible to calculate the distance d according to the operation of the drive units 5a, 5b, 5c. For example, in case of electric motors 51a, 51b, 51c it will be possible to calculate the displacement of the second cooking plate 2 associated to each motor by using proper sensors, such as an encoder 58.

It should be observed that according to a preferred embodiment, the reference position can be determined by a condition of contact in which contact between the second cooking plate 2 and the first cooking plate 1 occurs. More preferably, the reference position is determined by a simultaneous condition of contact between the second cooking plate 2 and the first cooking plate 1 in correspondence of the three non-aligned points 2a, 2b, 2c of the second cooking plate 2.

It will be also apparent that such condition of contact can be easily achieved as previously explained. In other words, the condition of contact is obtained by said moving the second cooking plate 2 toward the first cooking plate 1 according to all degrees of freedom until movement according to any of the degrees of freedom is prevented.

In a preferred embodiment, even after contact is detected, e.g. by means of measuring the electrical current and/or voltage and/or power absorbed by any of the drive units, at least one of the drive units 5a, 5b, 5c is further operated in order to still push the second cooking plate 2 towards the first cooking plate 1.

To this regard, it should be noted that each drive unit 5a, 5b, 5c does not necessarily produce a movement of the second cooking plate 2 according to a single degree of freedom. As a matter of fact, the second cooking plate 2, behaving as a rigid body, can be rotated, in a fashion similar to a lever, if pushed toward the first cooking plate in a condition of partial contact between plates. Therefore, the movement produced by a single drive unit can also involve movements in correspondence of the other drive units.

Nevertheless this can be hardly predicable due to the misalignment between cooking plates 1, 2.

If at least one of the drive units is operated even after the movement according to any of the degrees of freedom is prevented, i.e. the second cooking plate 2 is further pushed toward the first cooking plate 1 even after contact, such undesired rotation can be advantageously avoided.

In a preferred embodiment, the cooking plates 1, 2 are heated before reaching the condition of contact between the second cooking plate 2 and the first cooking plate 1, or when the second cooking plate 2 and the first cooking 1 are in the condition of contact.

It should be also observed that the same operations can be advantageously used both for controlling the distance d between the cooking plates 1, 2 and more in general for the purpose of setting-up a cooking appliance in which proper alignment of the cooking plates is required e.g. for obtaining a reference position according to which the distance between the cooking plates is calculated.

As matter of fact, in a preferred embodiment, the set-up of the appliance can comprise moving the second cooking plate 2 toward to the first cooking plate 1 until the condition of contact is reached. Accordingly, it is possible to define a reference position of the second cooking plate 2 by such condition of contact.

As previously explained, precision of the contact condition can be improved by heating the plates 1, 2, advantageously to their operating temperature, either before contact or when the condition of contact is reached, so as to take the cooking plates to the same thermal deformation they will have during operation.

This operation can be easily repeated on the first use of the appliance or during use its normal use as required.

It will be also appreciated that the operation method hereby described can be used for controlling the relative position of the cooking plates of any cooking appliance having a first and a second cooking plate.

What is claimed is:

1. Cooking appliance, comprising:
   a first cooking plate and a second cooking plate, said second cooking plate being positionable in an operating condition, in which said second cooking plate faces said first cooking plate, so as to be able to heat a product positioned on said first cooking plate, and in an open condition in which said second cooking plate is liftable with respect to said first cooking plate in such a way to allow freely positioning a food product on said first cooking plate,
   a positioning device for adjusting the position of the second cooking plate with respect to the first cooking plate when said second cooking plate is in said operating condition, said positioning device allowing an adjustment of said second cooking plate with respect to said first cooking plate having at least two degrees of freedom,
   a control unit operatively associated to said positioning device and configured to control movements of said second cooking plate for making said adjustment with respect to said first cooking plate individually for at least two of said at least two degrees of freedom, and
   at least one of the control unit or the positioning device being configured to direct said adjustment while in said operating condition based on a reference position at which said second cooking plate fully contacts said first cooking plate,
   wherein a displacement of said second cooking plate based on said adjustment relative to said reference position is detected by an encoder operatively coupled to and adapted to measure operation of one or more drive units that drive said movements of the second cooking plate.

2. Cooking appliance according to claim 1, wherein said at least two degrees of freedom comprise at least a rotation and a linear translation of said second cooking plate relative to said first cooking plate.

3. Cooking appliance according to claim 1, wherein said one or more drive units comprise an electric drive unit for each of said at least two degrees of freedom.

4. Cooking appliance according to claim 1, wherein said positioning device is capable of adjusting the position of three non-aligned points of the second cooking plate with respect to the first cooking plate, the positions of said three non-aligned points being adjustable along a direction perpendicular to said first cooking plate.

5. Cooking appliance according to claim 4, wherein the position of each of said non-aligned points is controlled by a respective electric drive unit.

6. Cooking appliance according to claim 1, wherein said one or more drive units are operable in a simultaneous or alternated manner so as to vary a distance between said first cooking plate and said second cooking plate.

7. Cooking appliance according to claim 1, further comprising a detecting device operationally associated to said positioning device so as to detect if relative movement of said second cooking plate toward said first cooking plate is prevented along any one of said at least two degrees of freedom.

8. Cooking appliance according to claim 1, wherein the at least one of the control unit or the positioning device is configured to direct said adjustment while each of the first and second cooking plates is at an operative cooking temperature.

9. Cooking appliance according to claim 1, wherein the displacement of the adjustment is detected only by measuring operation of said drive units.

10. Method for controlling a distance between cooking plates of a cooking appliance comprising a first cooking plate and a second cooking plate, said second cooking plate being positionable in an operating condition, in which said second cooking plate faces said first cooking plate, so as to be able to heat a product positioned on said first cooking plate, and in an open condition in which said second cooking plate is lifted with respect to said first cooking plate in such a way to allow freely positioning a food product on said first cooking plate, said method comprising:
   adjusting a position of the second cooking plate relative to the first cooking plate, when said second cooking plate is in said operating condition, by a movement of said second cooking plate having at least two degrees of freedom; and using an encoder that is operatively coupled to and adapted to measure operation of one or more drive units to calculate the distance between said first cooking plate and said second cooking plate with respect to a reference position in which said second cooking plate fully contacts said first cooking plate.

11. Method for controlling the distance between cooking plates according to claim 10, wherein said cooking plates are heated 4 to an operative cooking temperature before or after before said second cooking plate fully contacts said first cooking plate.

12. Method for controlling the distance between cooking plates according to claim 8, wherein adjusting the position of the second cooking plate relative to the first cooking plate, when said second cooking plate is in said operating condition, comprises at least rotating the second cooking plate with respect to the first cooking plate and linearly moving said second cooking plate relative to said first cooking plate.

13. Method for controlling the distance between cooking plates according to claim 10, wherein adjusting the position of the second cooking plate relative to the first cooking plate, when said second cooking plate is in said operating condition, comprises:

moving the second cooking plate toward the first cooking plate according to a first degree of freedom until a further movement according to said first degree of freedom is prevented as a result of contact between the second cooking plate and the first cooking plate;

moving the second cooking plate toward the first cooking plate according to a second degree of freedom until a further movement according to said second degree of freedom is prevented as a result of contact between the second cooking plate and the first cooking plate.

14. Method for controlling the distance between cooking plates according to claim 10, wherein the cooking appliance comprises at least one said one or more drive units for each of said at least two degrees of freedom, and wherein moving said second cooking plate with respect to said first cooking plate comprises operating said one or more drive units simultaneously or alternately.

15. Method for controlling the distance between cooking plates according to claim 13, wherein contact between the second cooking plate and the first cooking plate is detected by measuring the electrical current and/or voltage and/or power absorbed by said one or more drive units.

16. Method for controlling the distance between cooking plates according to claim 14, wherein moving the second cooking plate toward the first cooking plate comprises further operating said one or more drive units after the movement according to any of the degrees of freedom is prevented.

17. Method for controlling the distance between cooking plates according to claim 10, wherein said distance is detected only by measuring operation of said drive units.

* * * * *

UNITED STATES PATENT AND TRADEMARK OFFICE
CERTIFICATE OF CORRECTION

PATENT NO. : 11,013,367 B2  
APPLICATION NO. : 16/066400  
DATED : May 25, 2021  
INVENTOR(S) : Antonio Robles et al.

Page 1 of 1

It is certified that error appears in the above-identified patent and that said Letters Patent is hereby corrected as shown below:

In the Claims

Claim 11, Column 15, Line 12: delete "heated 4 to an operative cooking temperature before or after" and replace it with -- heated to an operative cooking temperature --

Claim 14, Column 16, Line 10: delete "at least one said one" and replace it with -- at least said one --

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*